B. CUTLER.
WAVE MOTOR.
APPLICATION FILED JULY 5, 1910.
976,988.
Patented Nov. 29, 1910.
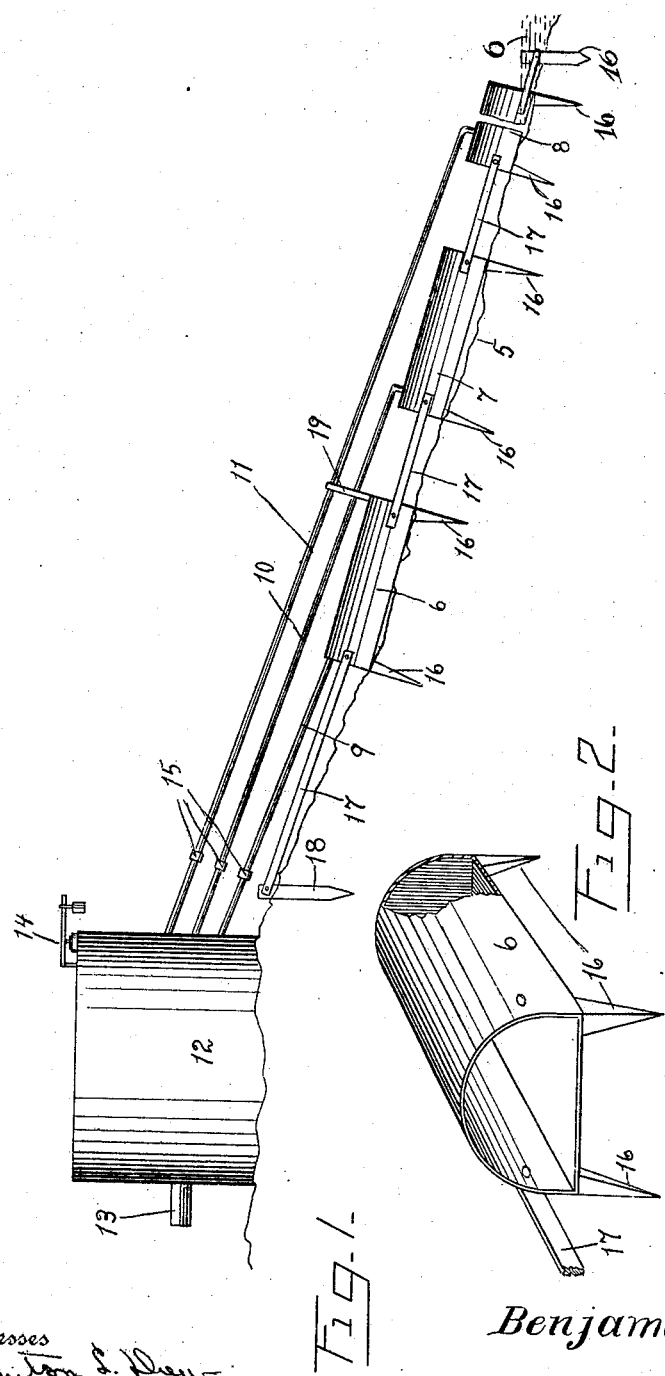
Witnesses
Clayton S. Drew
Anna M. Murray.
Inventor
Benjamin Cutler,
By Shepherd & Campbell
Attorneys

UNITED STATES PATENT OFFICE.

BENJAMIN CUTLER, OF CRAWFORDSVILLE, OREGON.

WAVE-MOTOR.

976,988.  Specification of Letters Patent.  Patented Nov. 29, 1910.

Application filed July 5, 1910. Serial No. 570,513.

*To all whom it may concern:*

Be it known that I, BENJAMIN CUTLER, a citizen of the United States of America, residing at Crawfordsville, in the county of Linn and State of Oregon, have invented certain new and useful Improvements in Wave-Motors, of which the following is a specification.

This invention relates to means for storing the power from waves, the object of the invention being to provide a structure constructed in such manner that the force of the ocean's waves may be utilized to store compressed air in a tank from which it may be used to drive a compressed air engine.

A further object of the invention is the provision of a wave motor constructed in such manner that the force of the waves may be utilized throughout the rise and fall of the tide.

Further objects and advantages of the invention will be set forth in the detailed description which now follows.

In the accompanying drawing, Figure 1 is a side elevation of a device constructed in accordance with the invention, and Fig. 2 is a detail perspective view of one of the compression chambers.

Like numerals designate corresponding parts in both of the figures of the drawing.

Referring to the drawing, the numeral 5 designates the shore line and the numeral 6′, the water level of any large body of water, such as an ocean, sea, or lake. Upon the inclined bank 5, a plurality of compression chambers 6, 7, and 8 are located in such position that the waves will enter one or the other of them as the tide rises and falls. The lowest position of the tide is indicated in Fig. 1. Air conducting pipes 9, 10, and 11 lead from these chambers to a storage tank 12. An outlet pipe 13 leads from this storage tank and serves to conduct compressed air therefrom to any desired point for use.

A safety valve 14 is preferably provided upon the tank 12 and check valves 15 are located in the pipes 9, 10, and 11 and open toward the tank 12. The chambers 6, 7, and 8 are provided with anchoring points 16 which, together with braces 17 and anchoring stakes 18, serve to firmly secure the chambers 6, 7, and 8 in position. A bracket 19 is carried by the chamber 6 and serves to support the pipes 10 and 11 from the chambers 7 and 8.

As is clearly illustrated in Fig. 2, the chambers 6, 7, and 8 are closed at their upper ends and open at their lower ends. It will be understood that as the waves sweep into said chambers, the air trapped therein will be compressed by the moving body of water with considerable force due to the inertia of the body of water, and will be forced through the pipes 9, 10, and 11 past the check valves 15 and into the tank 12. It will further be apparent that this action will continue substantially throughout the rise and fall of the tide, for the reason that by the time the lowermost chamber 8 is submerged, the waves will begin to sweep into the next chamber 7 and that by the time this chamber is submerged, the waves will begin to sweep into the chamber 6.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

Having described my invention, what I claim is:

1. The combination with a storage tank, of a plurality of compression chambers open at their rear ends, said chambers being disposed successively in advance of each other and upon an inclined plane, pipes leading from said chambers to the storage tank, check valves in said pipes opening toward said storage tank, and a plurality of anchoring points carried by each of said chambers.

2. The combination with a storage tank, of a plurality of compression chambers open at their rear ends, said chambers being disposed successively in advance of each other and upon an inclined plane, pipes leading from said chambers to the storage tank, check valves in said pipes opening toward said storage tank, a plurality of anchoring points carried by each of said chambers, and braces extending between said chambers to hold them in proper relation to each other.

3. The combination with a storage tank, of a plurality of compression chambers open at their rear ends, said chambers being disposed successively in advance of each other and upon an inclined plane, pipes leading from said chambers to the storage tank, check valves in said pipes opening toward said storage tank, a plurality of anchoring points carried by each of said chambers, braces extending between said chambers to held them in proper relation to each other, and a bracket carried by one of said chambers by which the pipes from the other of said chambers are supported.

In testimony whereof I affix my signature in presence of two witnesses.

BENJAMIN CUTLER.

Witnesses:
H. M. ROBERTS,
R. V. HENDERSON.